United States Patent
Lu et al.

(10) Patent No.: US 10,872,108 B2
(45) Date of Patent: Dec. 22, 2020

(54) METHOD AND APPARATUS FOR UPDATING MULTIMEDIA PLAYLIST

(71) Applicant: Baidu Online Network Technology (Beijing) Co., Ltd., Beijing (CN)

(72) Inventors: Guang Lu, Beijing (CN); Shiquan Ye, Beijing (CN); Xiajun Luo, Beijing (CN); Qiang Ju, Beijing (CN); Jian Xie, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 414 days.

(21) Appl. No.: 15/858,079

(22) Filed: Dec. 29, 2017

(65) Prior Publication Data

US 2019/0147053 A1   May 16, 2019

(30) Foreign Application Priority Data

Nov. 16, 2017   (CN) .......................... 2017 1 1140783

(51) Int. Cl.
| | |
|---|---|
| *G06F 16/00* | (2019.01) |
| *G06F 16/432* | (2019.01) |
| *G10L 15/22* | (2006.01) |
| *G10L 15/08* | (2006.01) |
| *G06F 16/41* | (2019.01) |
| *G06F 16/48* | (2019.01) |

(Continued)

(52) U.S. Cl.
CPC ............ *G06F 16/433* (2019.01); *G06F 3/167* (2013.01); *G06F 16/41* (2019.01); *G06F 16/4387* (2019.01); *G06F 16/48* (2019.01); *G10L 15/08* (2013.01); *G10L 15/22* (2013.01); *G10L 15/30* (2013.01); *G10L 2015/088* (2013.01); *G10L 2015/223* (2013.01)

(58) Field of Classification Search
CPC ........ G06F 16/433; G06F 3/167; G06F 16/41; G06F 16/48; G06F 16/4387; G10L 15/22; G10L 15/08; G10L 15/30; G10L 2015/223; G10L 2015/088
USPC ......................................................... 707/722
See application file for complete search history.

(56) References Cited

U.S. PATENT DOCUMENTS

| | | | | |
|---|---|---|---|---|
| 7,725,829 B1 * | 5/2010 | Wong | ................... | G11B 27/105 715/726 |
| 10,318,236 B1 * | 6/2019 | Pal | .......................... | G10L 15/22 |

(Continued)

*Primary Examiner* — Thanh-Ha Dang
(74) *Attorney, Agent, or Firm* — Knobbe, Martens, Olson & Bear LLP (57) ABSTRACT

Embodiments of the disclosure disclose a method and apparatus for updating a multimedia playlist. An embodiment of the method comprises: sending a current multimedia content playlist to a playing terminal; analyzing, in response to receiving a voice updating request from a user to update currently played multimedia content in the current multimedia content playlist, the voice updating request to obtain an updating instruction corresponding to the currently played multimedia content; searching in a preset multimedia content database based on the updating instruction to generate an optimized multimedia playlist; and sending the optimized multimedia playlist to the playing terminal. With the embodiment, a matching degree between the obtained optimized multimedia playlist and the user's updating instruction is higher, the search operation is simpler, and then the search consumes less hardware resources.

13 Claims, 7 Drawing Sheets

(51) Int. Cl.
   *G06F 16/438*   (2019.01)
   *G06F 3/16*   (2006.01)
   *G10L 15/30*   (2013.01)

(56) References Cited

U.S. PATENT DOCUMENTS

| | | | |
|---|---|---|---|
| 2004/0006474 A1* | 1/2004 | Gong | H04M 3/4938 |
| | | | 704/270.1 |
| 2006/0212444 A1* | 9/2006 | Handman | G11B 27/105 |
| 2006/0212478 A1* | 9/2006 | Plastina | G06F 16/639 |
| 2006/0218187 A1* | 9/2006 | Plastina | G06F 16/4387 |
| 2007/0214182 A1* | 9/2007 | Rosenberg | G11B 27/11 |
| 2009/0089327 A1* | 4/2009 | Kalaboukis | G11B 27/105 |
| 2012/0254806 A1* | 10/2012 | Gossweiler | G11B 27/105 |
| | | | 715/835 |
| 2012/0303713 A1* | 11/2012 | Harbick | G06F 16/24578 |
| | | | 709/204 |
| 2013/0096925 A1* | 4/2013 | Paik | G06F 16/639 |
| | | | 704/275 |
| 2013/0211565 A1 | 8/2013 | Kimoto | |
| 2015/0242068 A1* | 8/2015 | Losey | G11B 27/36 |
| | | | 715/716 |
| 2017/0358302 A1* | 12/2017 | Orr | G06F 16/433 |

* cited by examiner

METHOD AND APPARATUS FOR UPDATING MULTIMEDIA PLAYLIST

CROSS-REFERENCE TO RELATED APPLICATION

This application is related to and claims priority from Chinese Application No. 201711140783.3, filed on Nov. 16, 2017 and entitled "Method and Apparatus for Updating Multimedia Playlist", the entire disclosure of which is hereby incorporated by reference.

TECHNICAL FIELD

Embodiments of the present disclosure relate to the field of computer technology, specifically to the field of Internet technology, and more specifically to a method and apparatus for updating a multimedia playlist.

BACKGROUND

An existing multimedia platform may generate a playlist of all multimedia contents on the platform by interacting with a user.

For example, a user may get access to a multimedia platform, and generate a multimedia content playlist by inputting some search conditions, where multimedia contents in the multimedia content playlist are all provided by the multimedia platform. This way, the user may execute corresponding operations, such as playing and pausing, of the multimedia contents in the multimedia content playlist.

SUMMARY

An object of an embodiment of the disclosure is to provide a method and apparatus for updating a multimedia playlist.

In a first aspect, an embodiment of the disclosure provides a method for updating a multimedia playlist, including: sending a current multimedia content playlist to a playing terminal; analyzing, in response to receiving a voice updating request from a user to update currently played multimedia content in the current multimedia content playlist, the voice updating request to obtain an updating instruction corresponding to the currently played multimedia content; searching in a preset multimedia content database based on the updating instruction to generate an optimized multimedia playlist; and sending the optimized multimedia playlist to the playing terminal.

In some embodiments, the searching in a preset multimedia content database based on the updating instruction to generate an optimized multimedia playlist includes: judging, in response to the updating instruction including an identifier for a leading author, whether the updating instruction includes a switching word for indicating a switching operation; if yes, further judging whether a switching object indicated by the switching word is the currently played multimedia content; and if yes, searching by means of excluding the currently played multimedia content in the preset multimedia content database based on the identifier for the leading author to generate the optimized multimedia playlist.

In some embodiments, the leading author includes a multimedia content performer, and the method further includes: if the switching object indicated by the switching word is a performer of the currently played multimedia content, further judging whether the updating instruction includes a name of the currently played multimedia content; and if yes, searching by means of excluding the performer of the current multimedia content in the preset multimedia content database based on the name of the current multimedia content to generate the optimized multimedia playlist.

In some embodiments, the method further includes: if the switching object indicated by the switching word is a performer of the currently played multimedia content, further judging whether the updating instruction includes a negating word; and if yes, searching by means of excluding the performer of the current multimedia content with the name of the currently played multimedia content as a search condition to generate the optimized multimedia playlist.

In some embodiments, the searching in a preset multimedia content database based on the updating instruction to generate an optimized multimedia playlist includes: judging, in response to the updating instruction including the identifier for the leading author, whether the updating instruction includes a keyword belonging to a preset category; and if yes, searching in the preset multimedia content database with the identifier for the leading author and the keyword indicated by the updating instruction as a search condition to generate the optimized multimedia playlist; wherein the preset multimedia content database has a search index pre-established on a basis of the keyword.

In some embodiments, the updating instruction includes a plurality of keywords belonging to the preset category; and the searching in the preset multimedia content database with the identifier for the leading author and the keyword indicated by the updating instruction as a search condition to generate the optimized multimedia playlist includes: if multimedia content satisfying both the identifier for the leading author and all keywords contained in the updating instruction does not exist in the preset multimedia content database, selecting a portion of keywords from the all keywords contained in the updating instruction, and searching in the preset multimedia content database with the identifier for the leading author and the selected keywords indicated by the updating instruction as the search condition to generate the optimized multimedia playlist.

In some embodiments, the searching in a preset multimedia content database based on the updating instruction to generate an optimized multimedia playlist includes: judging whether the updating instruction includes similar search intention; and if yes, searching multimedia content including a similarity to the currently played multimedia content greater than a preset similarity threshold in the preset multimedia content database to generate the optimized multimedia playlist.

In some embodiments, the method further includes: if the updating instruction includes the similar search intention, further judging whether the updating instruction includes a keyword including a preset category; and if yes, searching multimedia content including a similarity to the currently played multimedia greater than the preset similarity threshold and satisfying a search condition indicated by the keyword included in the updating instruction in the preset multimedia content database to generate the optimized multimedia playlist; wherein the preset multimedia content database has a search index pre-established on a basis of the keyword.

In a second aspect, an embodiment of the disclosure further provides an apparatus for updating a multimedia playlist, including: a first sending unit configured for sending a current multimedia content playlist to a playing terminal; an analysis unit configured for analyzing, in response to receiving a voice updating request from a user to update currently played multimedia content in the current multimedia content playlist, the voice updating request to obtain an updating instruction corresponding to the currently played multimedia content; a generation unit configured for searching in a preset multimedia content database based on the updating instruction to generate an optimized multimedia playlist; and a second sending unit configured for sending the optimized multimedia playlist to the playing terminal.

In some embodiments, the generation unit is further configured for: judging, in response to the updating instruction including an identifier for a leading author, whether the updating instruction includes a switching word for indicating a switching operation; and if yes, further judging whether a switching object indicated by the switching word is the currently played multimedia content; and if yes, searching by means of excluding the currently played multimedia content in the preset multimedia content database based on the identifier for the leading author to generate the optimized multimedia playlist.

In some embodiments, the leading author includes a multimedia content performer, and the generation unit is further configured for: if the switching object indicated by the switching word is a performer of the currently played multimedia content, further judging whether the updating instruction includes a name of the currently played multimedia content; and if yes, searching by means of excluding the performer of the current multimedia content in the preset multimedia content database based on the name of the current multimedia content to generate the optimized multimedia playlist.

In some embodiments, the generation unit is further configured for: if the switching object indicated by the switching word is a performer of the currently played multimedia content, further judging whether the updating instruction includes a negating word; and if yes, searching by means of excluding the performer of the current multimedia content with the name of the currently played multimedia content as a search condition to generate the optimized multimedia playlist.

In some embodiments, the generation unit is further configured for: judging, in response to the updating instruction including the identifier for the leading author, whether the updating instruction includes a keyword belonging to a preset category; and if yes, searching in the preset multimedia content database with the identifier for the leading author and the keyword indicated by the updating instruction as a search condition to generate the optimized multimedia playlist; wherein the preset multimedia content database has a search index pre-established on a basis of the keyword.

In some embodiments, the updating instruction includes a plurality of keywords belonging to the preset category; and the generation unit is further configured for: searching in the preset multimedia content database with the identifier for the leading author and the keyword indicated by the updating instruction as a search condition to generate the optimized multimedia playlist by: if multimedia content satisfying both the identifier for the leading author and all keywords contained in the updating instruction does not exist in the preset multimedia content database, selecting a portion of keywords from the all keywords contained in the updating instruction, and searching in the preset multimedia content database with the identifier for the leading author and the selected keywords indicated by the updating instruction as the search condition to generate the optimized multimedia playlist.

In some embodiments, the generation unit is further configured for: judging whether the updating instruction includes similar search intention; and if yes, searching multimedia content including a similarity to the currently played multimedia content greater than a preset similarity threshold in the preset multimedia content database to generate the optimized multimedia playlist.

In some embodiments, the generation unit is further configured for: if the updating instruction includes the similar search intention, further judging whether the updating instruction includes a keyword including a preset category; and if yes, searching multimedia content including a similarity to the currently played multimedia greater than the preset similarity threshold and satisfying a search condition indicated by the keyword included in the updating instruction in the preset multimedia content database to generate the optimized multimedia playlist; wherein the preset multimedia content database has a search index pre-established on a basis of the keyword.

In a third aspect, an embodiment of the disclosure further provides a device, including: one or more processors; and a storage for storing one or more programs; where the one or more programs, when executed by the one or more processors, enable the one or more processors to implement the method.

In a fourth aspect, an embodiment of the disclosure further provides a computer readable storage medium storing computer programs, where the programs, when executed by a processor, enable the processor to implement the method.

A method and apparatus for updating a multimedia playlist provided in an embodiment of the disclosure analyze a user's voice updating request for updating currently played multimedia content in the current multimedia content playlist to generate an updating instruction corresponding to the currently played multimedia content; and search in a preset multimedia content database based on the updating instruction to generate an optimized multimedia playlist. The embodiment realizes optimizing the multimedia playlist based on the currently played multimedia content, and searching in the multimedia content database using condition superposition, so that a matching degree between the obtained optimized multimedia playlist and the user's updating instruction is higher, the search operation is simpler, and then the search consumes less hardware resources.

BRIEF DESCRIPTION OF THE DRAWINGS

By reading and referring to the detailed description of non-limiting embodiments provided in the accompanying drawings, other features, objects and advantages of the disclosure will become clearer.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
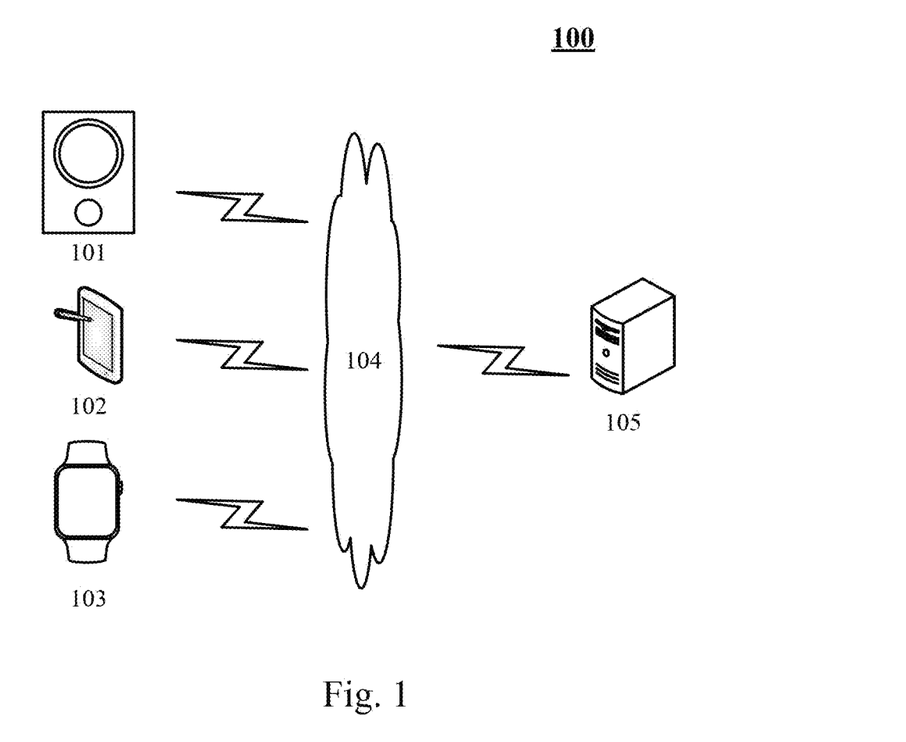
FIG. 1 is an illustrative system structure diagram where the disclosure may be applied.

FIG. 1 shows an exemplary architecture of a system 100 which may be used by a method or apparatus for updating a multimedia playlist according to the embodiments of the present disclosure.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

A user may interact with the server 105 using the terminal devices 101, 102 and 103 through the network 104 to receive or send messages, etc. The terminal devices 101, 102 and 103 may be installed with communication client applications, such as a multimedia playing application, a web browser application, a search application, an instant messaging tool and social platform software.

The terminal devices 101, 102 and 103 may be electronic devices including a man-machine interaction function and a multimedia playing function, including but not limited to: a smart phone, a smart multimedia playing device, a smart wearable device, a tablet PC, a laptop portable computer, a desk computer, etc.

The server 105 may be a server providing a variety of services, such as a background multimedia server providing supports for voice updating requests sent by the terminal devices 101, 102 and 103. The background multimedia server may implement analysis and other processing of the received data, such as a voice updating request, and send feedback of the processing result (such as the generated optimized multimedia playlist) to the terminal terminals 101, 102 and 103.

It should be noted that the method for pushing multimedia content provided in the embodiments of the disclosure is generally executed by the server 105, and correspondingly, the apparatus for pushing multimedia content is generally arranged in the server 105.

It should be understood that the numbers of terminal devices, networks and servers in FIG. 1 are only indicative. Depending on the actual needs, any numbers of terminal devices, networks and servers may exist.

Figure 2:
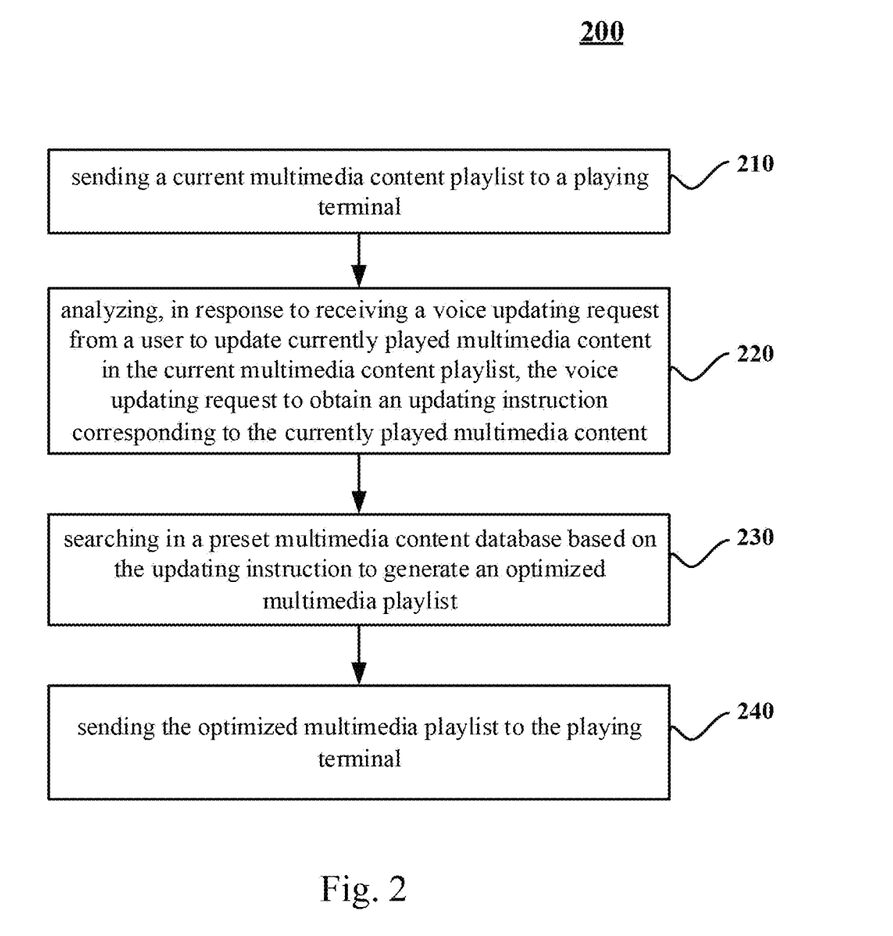
FIG. 2 is a process diagram of an embodiment of a method for updating a multimedia playlist according to the disclosure.

Further referring to FIG. 2, a process 200 of an embodiment of a method for updating a multimedia playlist according to the disclosure is shown. The method for updating a multimedia playlist includes the following steps:

Step 210, sending a current multimedia content playlist to a playing terminal.

In this embodiment, an electronic device (e.g., a server shown in FIG. 1) on which the method for updating a multimedia playlist runs may send a current multimedia content playlist to a playing terminal through wired connection or wireless connection. It should be noted that the wireless connection may include, but is not limited to, 3G/4G connection, WiFi connection, bluetooth connection, WiMAX connection, Zigbee connection, UWB (ultra wideband) connection, and other wireless connections that are known at present or will be developed in the future.

In some optional modes of implementing this embodiment, the current multimedia playlist may be generated based on a user's instruction, for example, generated based on the user's instruction "play a song of a singer A". Then, correspondingly, multimedia contents in the current playlist are all songs sung by the singer A.

Alternatively, in some other optional modes of implementing this embodiment, the current multimedia playlist may also be actively pushed by the electronic device on which the method for updating a multimedia playlist according to this embodiment runs to the playing terminal.

After receiving the current multimedia content playlist, the playing terminal may play the multimedia contents in the received current multimedia content playlist in a play mode (such as a loop play mode, a shuffle play mode or a single loop mode). Here, the play mode may have a plurality of division manners and division results. The play mode division is not the key point of the disclosure, and is not repeated any more here.

Step 220, analyzing, in response to receiving a voice updating request from a user to update currently played multimedia content in the current multimedia content playlist, the voice updating request to obtain an updating instruction corresponding to the currently played multimedia content.

In some application scenarios, the playing terminal may be integrated with a voice receiving module. Thus, the playing terminal may receive a user's voice updating request, and send the received user's voice updating request to the electronic device on which the method for updating a multimedia playlist according to this embodiment is applied, so that the electronic device analyzes the voice updating request.

Alternatively, in some other application scenarios, the playing terminal may have a voice receiving device in communication connection with it. In these application scenarios, the voice receiving device may send the received user's voice updating request to the playing terminal, and send the received user's voice updating request to the electronic device on which the method for updating a multimedia playlist according to this embodiment is applied, so that the electronic device analyzes the voice updating request.

Alternatively, in some other application scenarios, the voice receiving device may be in communication connection with the electronic device on which the method for updating a multimedia playlist according to this embodiment is applied. In these application scenarios, the voice receiving device may send the received user's voice updating request to the electronic device, so that the electronic device analyzes the voice updating request.

When the voice updating request is analyzed to obtain an updating instruction corresponding to the currently played multimedia content, firstly the voice updating request may be converted to a corresponding text by voice recognition of the voice updating request. Then, the updating instruction corresponding to the currently played multimedia content may be obtained by semantic understanding of the text generated by conversion. For example, the text obtained by voice recognition is "play a quiet song", and after semantic understanding of the text, the updating instruction, e.g., may be "quiet".

Step 230, searching in a preset multimedia content database based on the updating instruction to generate an optimized multimedia playlist.

Here, the multimedia content database may be a database storing large amounts of multimedia contents. In some optional modes of implementing this embodiment, the database may be maintained by the electronic device on which the method for updating a multimedia playlist according to this embodiment is applied. Or, in some other optional modes of implementing this embodiment, the database may also be a database in communication connection with the electronic device on which the method for updating a multimedia playlist according to this embodiment is applied.

The electronic device may search in the database with the updating instruction obtained by the analyzing the voice updating request in the step 220 as the search condition, so as to obtain the multimedia contents meeting the search condition. The multimedia contents meeting the search condition form the optimized multimedia playlist.

In some optional modes of implementing this embodiment, the preset multimedia content database has a tag based on a pre-established index. Here, the tag may be understood as a word that can characterize at least a part of characteristics of the multimedia content, for example, a tag that can characterize a publication date (e.g., the 1980s and the 1990s) of the multimedia content, and a tag that can characterize the performance style (e.g., enthusiastic and quite) of the multimedia content. It is understandable that the more comprehensive the characteristic covered by the tag of the preset multimedia content database is, the more it is conducive to obtaining the optimized multimedia playlist complying with the updating instruction by filtering the database. On the other hand, the more detailed the tag set for a characteristic is, the more it is conducive to the optimized multimedia playlist meeting the fine-grained updating instruction, e.g., the optimized multimedia playlist more accurately corresponding to the user needs can be obtained.

In some application scenarios, for example, a current multimedia playlist is generated based on a user's instruction "play A's song". Then, if the updating instruction is "quiet", then quiet songs of the singer A may be generated as the optimized multimedia playlist by filtering the current multimedia playlist.

Step 240, sending the optimized multimedia playlist to the playing terminal.

After sending the optimized multimedia playlist to the playing terminal, the playing terminal may play the multimedia content in the received optimized multimedia playlist in a play mode based on the user's option.

An updating instruction corresponding to the currently played multimedia content is generated by analyzing the user's voice updating request for updating the currently played multimedia content in the current multimedia content playlist, and an optimized multimedia playlist is generated by searching in the preset multimedia content database based on the updating instruction, thereby realizing optimizing the multimedia playlist based on the currently played multimedia content, and realizing searching in the multimedia content database using condition superposition, so that a matching degree between the obtained optimized multimedia playlist and the user's updating instruction is higher, the search operation is simpler, and then the search consumes less hardware resources.

Figure 3:
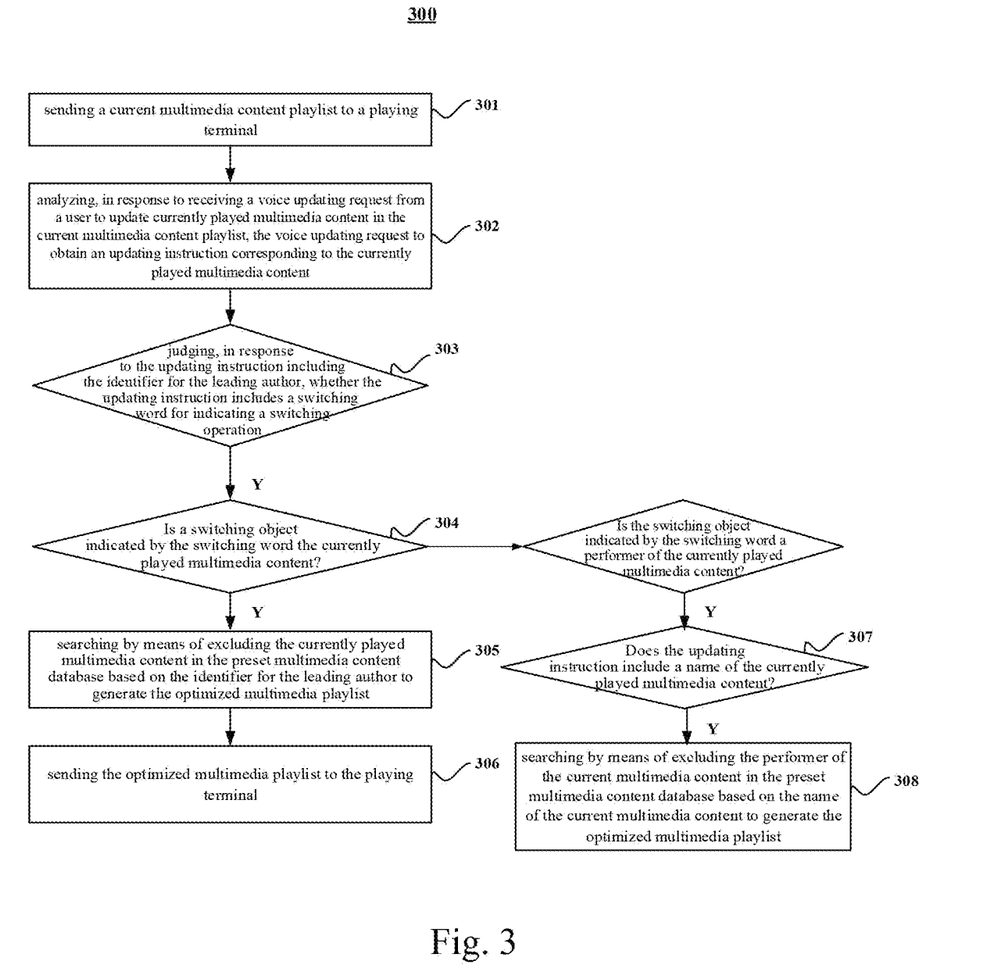
FIG. 3 is a process diagram of another embodiment of a method for updating a multimedia playlist according to the disclosure.

Referring to FIG. 3, an illustrative process diagram 300 of another embodiment of a method for updating a multimedia playlist according to the disclosure is shown.

The method according to this embodiment includes:

Step 301, sending a current multimedia content playlist to a playing terminal.

Step 302, analyzing, in response to receiving a voice updating request from a user to update currently played multimedia content in the current multimedia content playlist, the voice updating request to obtain an updating instruction corresponding to the currently played multimedia content.

The step 301 and the step 302 in this embodiment may have the modes of implementation similar to the step 210 and the step 220 in the embodiment shown in FIG. 2, and are not repeated any more here.

Step 303, judging, in response to the updating instruction including the identifier for the leading author, whether the updating instruction includes a switching word for indicating a switching operation.

Here, the identifier for the leading author, for example, may be any identifier for a main author of multimedia content. For example, if the multimedia content is a song, then the identifier for the leading author may indicate a singer, a lyricist, a composer or the like of the song. Or, if the multimedia content is a movie, then the identifier for the leading author may indicate a leading actor, a director, a scriptwriter or the like of the movie.

In some optional modes of implementing this embodiment, the electronic device on which the method for updating a multimedia playlist according to this embodiment is applied may preset a leading author list, which, for example, may cover leading authors of the existing multimedia content as comprehensively as possible. For example, in some application scenarios, the updating instruction contains "Ja* Chou", then "Ja* Chou" may be searched as the keyword in the preset leading author list, and if the preset leading author list contains "Ja* Chou", then it may be considered that the updating instruction contains the identifier for the leading author.

Here, the switching word may be a word that may characterize the meaning of stopping playing the current multimedia content and changing to another multimedia content, such as "change", "other" and "another". In some application scenarios, the electronic device on which the method for updating a multimedia playlist according to this embodiment is applied may preset a switching word list, which may pre-store switching words as fully as possible. The electronic device determines whether the updating instruction contains a switching word by judging whether the updating instruction contains a word in the switching word list.

Step 304, if yes, further judging whether a switching object indicated by the switching word is the currently played multimedia content.

For example, in some application scenarios, the updating instruction obtained by analysis is "changing to other songs of Ja* Chou", then the updating instruction intention may be determined to be keeping the leading author unchanged (still "Ja* Chou"), but playing other songs of him. Then, in this application scenario, the switching word in the updating instruction may be considered to be a switching word for the currently played multimedia content.

Step 305, if yes, searching by means of excluding the currently played multimedia content in the preset multimedia content database based on the identifier for the leading author to generate the optimized multimedia playlist.

Here, if the updating instruction is intended to change to other multimedia contents of the leading author indicated by the currently played multimedia content, then the optimized multimedia playlist may be generated by search with the identifier for the leading author as the search keyword, and the currently played multimedia content may be eliminated from the generated optimized multimedia playlist.

Step 306, sending the optimized multimedia playlist to the playing terminal.

Figure 4:
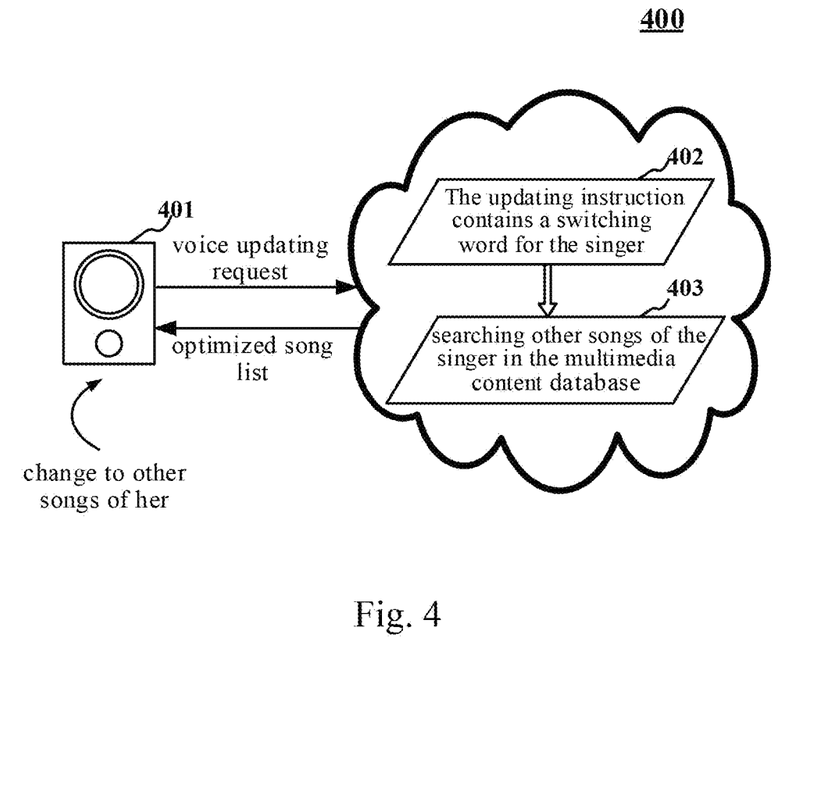
FIG. 4 is a schematic diagram of an application scenario of a method for updating a multimedia playlist according to the disclosure.

Referring to FIG. 4, a schematic diagram 400 of an application scenario of this embodiment is shown.

In this application scenario, the playing terminal, for example, may be a smart loudspeaker box 401.

When the smart loudspeaker box 401 is playing a song in the current song list, the user says "change to other songs of her".

The voice receiving module of the smart loudspeaker box 401 may receive the voice and send the voice to the server.

Then, as shown by a reference number 402 in the figure, the server analyzes the voice and determines the updating instruction containing a switching word "change" for the singer. Then, as shown by a reference number 403 in the figure, the server searches other songs of the singer in the multimedia content database, and eliminates the currently played song of the singer. The search result is sent as an optimized song list to the smart loudspeaker box.

Thus, the generation of the optimized song list is completed.

In some optional modes of implementing this embodiment, the leading author may include a performer of the multimedia content. In these optional modes of implementation, the method according to this embodiment may further include:

Step 307, if the switching object indicated by the switching word is a performer of the currently played multimedia content, further judging whether the updating instruction includes a name of the currently played multimedia content.

Step 308, if yes, searching by means of excluding the performer of the current multimedia content in the preset multimedia content database based on the name of the current multimedia content to generate the optimized multimedia playlist.

For example, in some application scenarios, the currently played multimedia content is a song A, and the updating instruction is "song A, changing a singer". It may be determined that the switching object indicated by the switching word in the updating instruction is the performer. Then, it may be determined by further judging that the updating instruction is specific to the performer. Then, it may be considered that the user's search is intended to sing this song by another singer. Therefore, the name of the current multimedia content may be searched as the keyword in the preset multimedia content database, and the given song sung by the current singer may be eliminated from the search result, thus generating the optimized multimedia playlist.

In these optional modes of implementation, the method for updating a multimedia playlist according to this embodiment may further include:

Step 309, if the switching object indicated by the switching word is a performer of the currently played multimedia content, further judging whether the updating instruction includes a negating word.

Step 310, if yes, searching by means of excluding the performer of the current multimedia content with the name of the currently played multimedia content as a search condition to generate the optimized multimedia playlist.

For example, in some application scenarios, the currently played multimedia content is a song A, and the updating instruction is "don't play hers". It may be determined that the switching object indicated by the switching word in the updating instruction is the performer. Then, it may be determined by further judging that the updating instruction contains a negating word "not". In these application scenarios, it may be determined that the user's current intention is to listen to this song of in versions other singers. Therefore, the name of the current multimedia content may be searched as the keyword in the preset multimedia content database, and the given song sung by the current singer may be eliminated from the search result, thus generating the optimized multimedia playlist.

Figure 5:
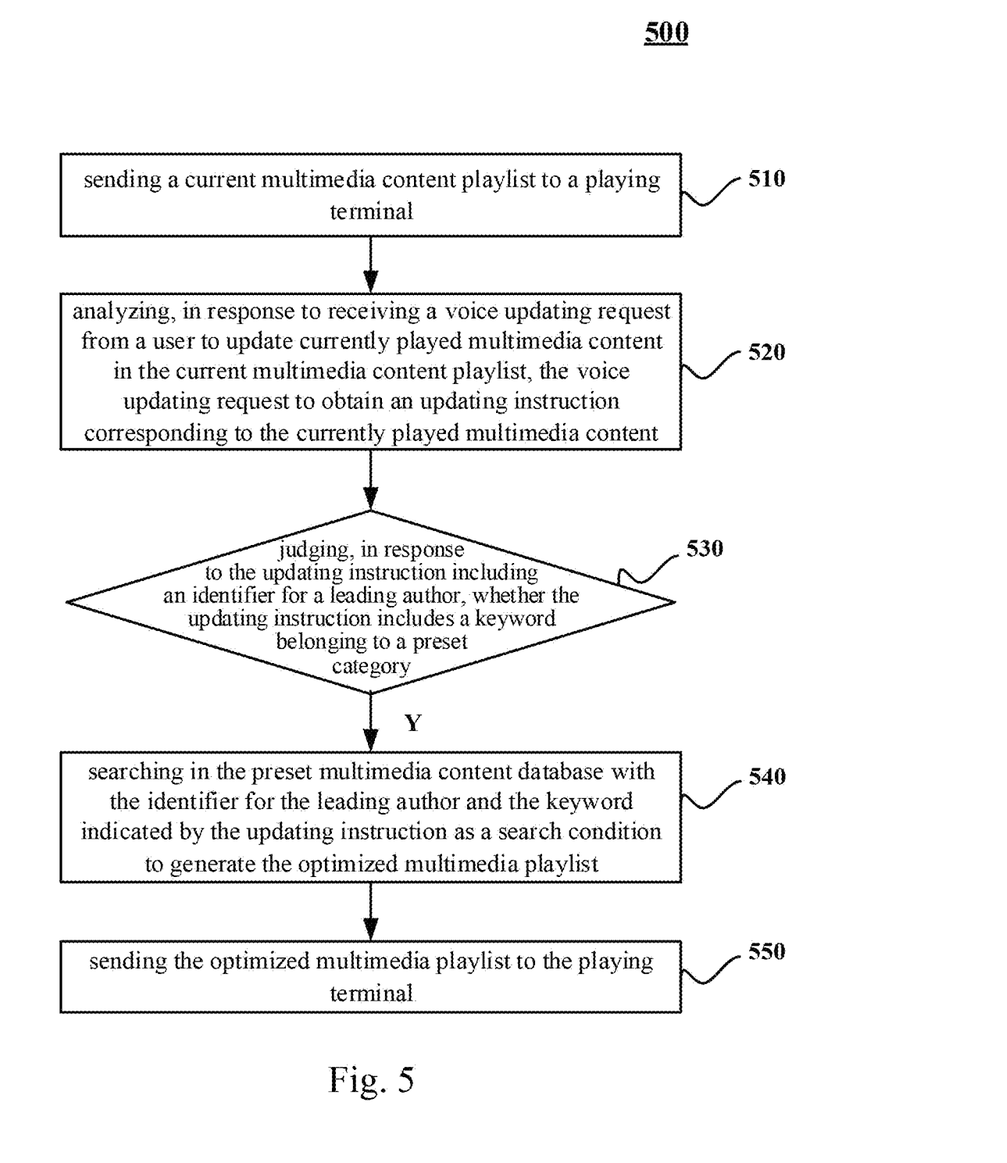
FIG. 5 is a process diagram of another embodiment of a method for updating a multimedia playlist according to the disclosure.

Referring to FIG. 5, an illustrative process diagram 500 of another embodiment of a method for updating a multimedia playlist according to the disclosure is shown.

The method according to this embodiment includes:

Step 510, sending a current multimedia content playlist to a playing terminal.

Step 520, analyzing, in response to receiving a voice updating request from a user to update currently played multimedia content in the current multimedia content playlist, the voice updating request to obtain an updating instruction corresponding to the currently played multimedia content.

The step 510 and the step 520 in this embodiment may have the modes of implementation similar to the step 210 and the step 220 in the embodiment shown in FIG. 2, and are not repeated any more here.

Step 530, judging, in response to the updating instruction including an identifier for a leading author, whether the updating instruction includes a keyword belonging to a preset category.

Here, the preset category, e.g., may characterize the characteristic of multimedia content in one aspect. For example, the category may be preset for characterizing a type, a style or a language of the multimedia content, whether it is a new song or whether it is a popular song. Under the category of "type", a plurality of keywords (e.g., rock, pop, bel canto, folk, opera and rap) may be set for describing types of multimedia content. Similarly, under the category of "style", a plurality of keywords (e.g., quiet, active and jazzy) may be set for describing styles of multimedia content. Similarly, under the category of "language", a plurality of keywords (for example, Chinese, English, French and Japanese) may be set for describing languages used in multimedia content. Similarly, under the category of whether being a new song or whether being a popular song, a plurality of keywords may also be set accordingly.

Step 540, if yes, searching in the preset multimedia content database with the identifier for the leading author and the keyword indicated by the updating instruction as a search condition to generate the optimized multimedia playlist.

In the method according to this embodiment, the preset multimedia content database may have a search index pre-established on a basis of the keyword.

Thus, search may be implemented in the preset multimedia content database with the identifier for the leading author and the keyword as a search condition, and the search result may be used as the optimized multimedia playlist.

Step 550, sending the optimized multimedia playlist to the playing terminal.

In some optional modes of implementing this embodiment, the updating instruction may include a plurality of preset keywords. In some optional modes of implementing this embodiment, the step 540 in this embodiment may further include:

Step 541, if multimedia content satisfying both the identifier for the leading author and all keywords contained in the updating instruction does not exist in the preset multimedia content database, selecting a portion of keywords from the all keywords contained in the updating instruction, and searching in the preset multimedia content database with the identifier for the leading author and the selected keywords indicated by the updating instruction as the search condition to generate the optimized multimedia playlist.

In some application scenarios, it is assumed that the updating instruction includes a plurality of preset keywords, such as the updating instruction "listen to a new English song of him". "English" is used for characterizing the language of the song, and "new" is used for characterizing whether the song is a new song. In these application scenarios, if no multimedia content satisfies all the three search conditions: leading author, English and new song, of the currently played song in the multimedia content database, then one of the two keywords "English" and "new" may be selected therefrom, and be searched in the multimedia content database together with the leading author of the currently played song as the search condition. For example, English songs of the singer are searched in the multimedia content database with "singer" and "English" as the search condition.

In addition, in some application scenarios, if the corresponding multimedia content is not found in the multimedia content database with the identifier for the leading author and the keyword as the search condition, the electronic device on which the method for updating a multimedia playlist according to this embodiment is applied may send feedback of prompt information for characterizing "related resource is not found" to the playing terminal, so that the playing terminal plays the prompt information.

In some optional modes of implementing the embodiments of the disclosure, the searching in a preset multimedia content database based on the updating instruction to generate an optimized multimedia playlist may further include the following steps:

judging whether the updating instruction includes similar search intention; and if yes, searching multimedia content including a similarity to the currently played multimedia content greater than a preset similarity threshold in the preset multimedia content database to generate the optimized multimedia playlist.

For example, in some application scenarios, the updating instruction is "whether there is a similar song", and then it may be considered that the updating instruction includes a similar search intention. Then, songs similar to the currently played multimedia content may be searched in the multimedia content database, and the search result is used as the optimized multimedia list.

In these optional modes of implementing this embodiment, the similarity between two multimedia contents, e.g., may be determined based on at least one of followings.

One is based on the number of co-occurrences of two multimedia contents in a historical playlist. For example, in a preset multimedia playlist database, the number of occurrences of multimedia content a1 and multimedia content c1 in a given multimedia playlist is d1, while in the preset multimedia playlist database, the number of occurrences of the multimedia content a1 and multimedia content c2 in a given multimedia playlist is d2. If d1> d2, then it may be considered that the similarity between the multimedia content c1 and the multimedia content a1 is higher than the similarity between the multimedia content c2 and the multimedia content a1.

Another is based on the similarity between performance style tags of two multimedia contents. For example, in some application scenarios, multimedia contents have at least one preset style tag. In these application scenarios, two multimedia contents have an identical style tag, and then it may be considered that both have a high similarity. It is understandable that if the multimedia content respectively have a plurality of style tags, then the more the identical style tags possessed by the two multimedia contents are, the higher the similarity between the two multimedia contents is.

Still another is the degree of association between tags of leading authors of two multimedia contents. For example, in some application scenarios, multimedia contents all have tags of leading authors. For example, if the multimedia content is a song, then the tag of a leading author may indicate a singer, a lyricist, a composer, or the like of the song. Or, if the multimedia content is a movie, then the tag of a leading author may indicate a leading actor, a director, a scriptwriter or the like of the movie. In these application scenarios, if two multimedia contents have an identical tag of a leading author, then it may be considered that the two have a high similarity.

It is understandable that if the similarity between two multimedia contents is determined using the above two or the above, the similarity determined based on similarity determination algorithms may be weighted to determine the final similarity between them.

In some application scenarios of these optional modes of implementing this embodiment, if the updating instruction includes similar search intention, then whether the updating instruction includes a keyword including a preset category may be further judged; and if yes, multimedia content including a similarity to the currently played multimedia greater than a preset similarity threshold and satisfying the search condition indicated by the keyword included in the updating instruction is searched in the preset multimedia content database to generate the optimized multimedia playlist.

The preset multimedia content database therein has a search index pre-established on a basis of the keyword.

For example, in these application scenarios, if the updating instruction is "whether there is a similar English song", then it may be considered that the updating instruction includes a similar search intention, and "English" is used as the preset keyword of the language category. Then, English songs similar to the currently played multimedia content may be searched in the multimedia content database, and the search result is used as the optimized multimedia list.

It is understandable that the updating instruction is assumed to include a plurality of preset keywords, and if multimedia content similar to the currently played multimedia content and satisfying the keyword of each preset category is not found by search in the preset multimedia content database, then a part of keywords may be selected from all keywords contained in the updating instruction, and the multimedia content satisfying the selected keywords and similar to the currently played multimedia is searched in the preset multimedia content database using the selected keywords as the search condition to generate the optimized multimedia playlist.

In addition, in some application scenarios, if the multimedia content similar to the currently played multimedia content is not found in the multimedia content database with the keywords as the search condition, the electronic device on which the method for updating a multimedia playlist is applied may send feedback of prompt information for characterizing "related resource is not found" to the playing terminal, so that the playing terminal plays the prompt information.

Figure 6:
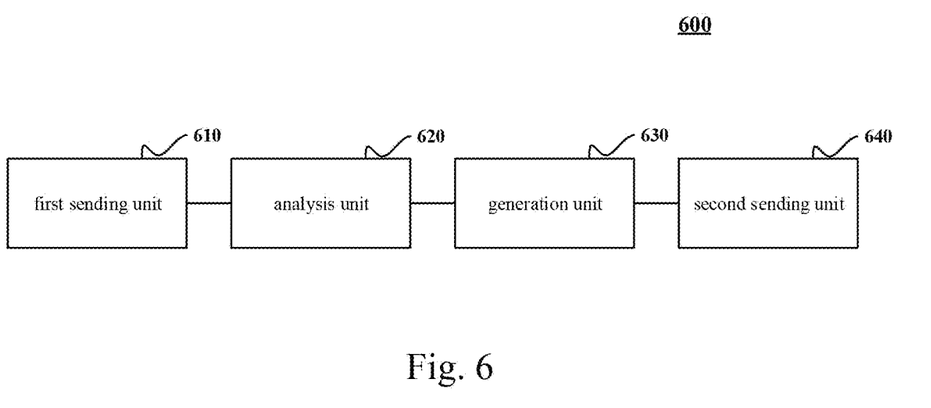
FIG. 6 is a structural diagram of an embodiment of an apparatus for updating a multimedia playlist according to the disclosure.

Further referring to FIG. 6, as implementation of the methods shown in the figures, the disclosure provides an embodiment of an apparatus for updating a multimedia playlist, the embodiment of the apparatus corresponds to the embodiment of the method shown in FIG. 2, and the apparatus may be specifically applied in a variety of electronic devices.

As shown in FIG. 6, an apparatus 600 for updating a multimedia playlist according to this embodiment includes: a first sending unit 610, an analysis unit 620, a generation unit 630 and a second sending unit 640.

The first sending unit 610 may be configured for sending a current multimedia content playlist to a playing terminal.

The analysis unit 620 may be configured for analyzing, in response to receiving a voice updating request from a user to update currently played multimedia content in the current multimedia content playlist, the voice updating request to obtain an updating instruction corresponding to the currently played multimedia content.

The generation unit 630 may be configured for searching in a preset multimedia content database based on the updating instruction to generate an optimized multimedia playlist.

The second sending unit 640 may be configured for sending the optimized multimedia playlist to the playing terminal.

In some optional modes of implementing this embodiment, the generation unit 630 may be further configured for: judging, in response to the updating instruction including an identifier for a leading author, whether the updating instruction includes a switching word for indicating a switching operation; if yes, further judging whether a switching object indicated by the switching word is the currently played multimedia content; and if yes, searching by means of excluding the currently played multimedia content in the preset multimedia content database based on the identifier for the leading author to generate the optimized multimedia playlist.

In some optional modes of implementing this embodiment, the leading author may include a multimedia content performer, and the generation unit 630 may be further configured for: if the switching object indicated by the switching word is a performer of the currently played multimedia content, further judging whether the updating instruction includes a name of the currently played multimedia content; and if yes, searching by means of excluding the performer of the current multimedia content in the preset multimedia content database based on the name of the current multimedia content to generate the optimized multimedia playlist.

In these optional modes of implementing this embodiment, the generation unit 630 may be configured for: if the switching object indicated by the switching word is a performer of the currently played multimedia content, further judging whether the updating instruction includes a negating word; and if yes, searching by means of excluding the performer of the current multimedia content with the name of the currently played multimedia content as a search condition to generate the optimized multimedia playlist.

In some optional modes of implementing this embodiment, the generation unit 630 may be configured for: judging, in response to the updating instruction including the identifier for the leading author, whether the updating instruction includes a keyword belonging to a preset category; and if yes, searching in the preset multimedia content database with the identifier for the leading author and the keyword indicated by the updating instruction as a search condition to generate the optimized multimedia playlist; wherein the preset multimedia content database has a search index pre-established on a basis of the keyword.

In some optional modes of implementing this embodiment, the updating instruction includes a plurality of keywords belonging to the preset category. In these optional modes of implementing this embodiment, the generation unit 630 may be configured for: searching in the preset multimedia content database with the identifier for the leading author and the keyword indicated by the updating instruction as a search condition to generate the optimized multimedia playlist by: if multimedia content satisfying both the identifier for the leading author and all keywords contained in the updating instruction does not exist in the preset multimedia content database, selecting a portion of keywords from the all keywords contained in the updating instruction, and searching in the preset multimedia content database with the identifier for the leading author and the selected keywords indicated by the updating instruction as the search condition to generate the optimized multimedia playlist.

In some optional modes of implementing this embodiment, the generation unit 630 may be configured for: judging whether the updating instruction includes similar search intention; and if yes, searching multimedia content including a similarity to the currently played multimedia content greater than a preset similarity threshold in the preset multimedia content database to generate the optimized multimedia playlist.

In some optional modes of implementing this embodiment, the generation unit 630 may be configured for: if the updating instruction includes the similar search intention, further judging whether the updating instruction includes a keyword including a preset category; and if yes, searching multimedia content including a similarity to the currently played multimedia greater than the preset similarity threshold and satisfying a search condition indicated by the keyword included in the updating instruction in the preset multimedia content database to generate the optimized multimedia playlist; wherein the preset multimedia content database has a search index pre-established on a basis of the keyword.

Below referring to FIG. 7, a structural diagram of a computer system 700 of a terminal device/server applicable for implementing the embodiments of the disclosure is shown. The terminal device/server shown in FIG. 7 is only an example, and shall not limit the functions and serviceable range of the embodiments of the disclosure in any way.

Figure 7:
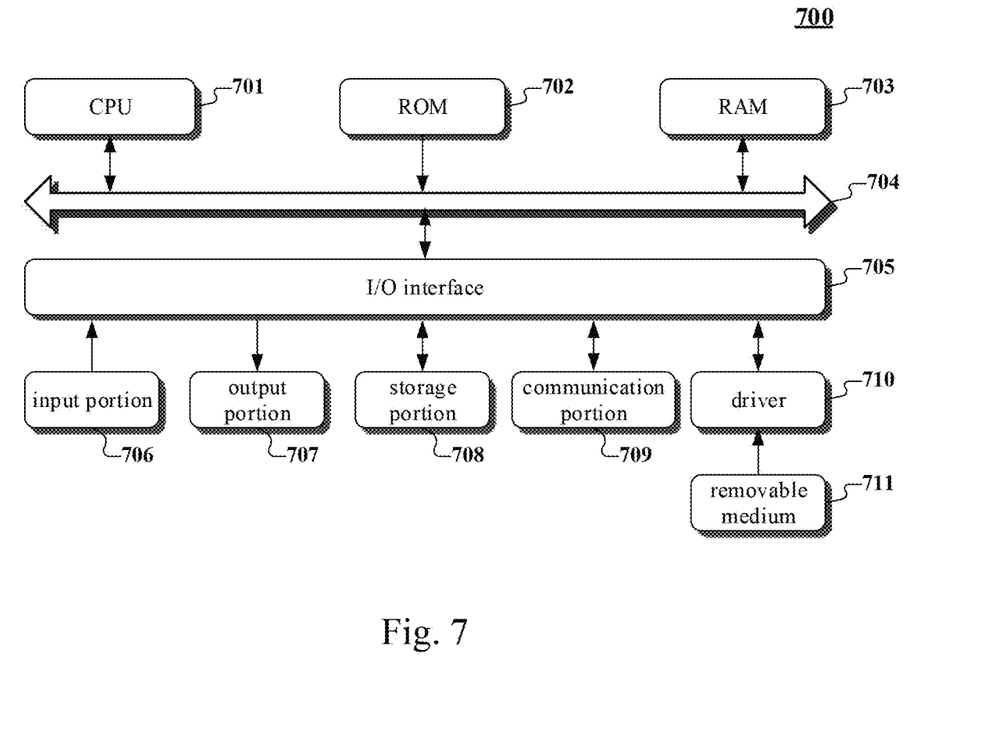
FIG. 7 is a structural diagram of a computer system of a terminal device or a server applicable for implementing the embodiments of the disclosure.

As shown in FIG. 7, the computer system 700 includes a central processing unit (CPU) 701, which may execute various appropriate actions and processes in accordance with a program stored in a read-only memory (ROM) 702 or a program loaded into a random access memory (RAM) 703 from a storage portion 708. The RAM 703 also stores various programs and data required by operations of the system 700. The CPU 701, the ROM 702 and the RAM 703 are connected to each other through a bus 704.

An input/output (I/O) interface 705 is also connected to the bus 704.

The following components are connected to the I/O interface 705: an input portion 706 including a keyboard, a mouse etc.; an output portion 707 comprising a cathode ray tube (CRT), a liquid crystal display device (LCD), a speaker etc.; a storage portion 708 including a hard disk and the like; and a communication portion 709 comprising a network interface card, such as a LAN card and a modem. The communication portion 709 performs communication processes via a network, such as the Internet. A driver 710 is also connected to the I/O interface 705 as required. A removable medium 711, such as a magnetic disk, an optical disk, a magneto-optical disk, and a semiconductor memory, may be installed on the driver 710, to facilitate the retrieval of a computer program from the removable medium 711, and the installation thereof on the storage portion 708 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 709, and/or may be installed from the removable media 711. The computer program, when executed by the central processing unit (CPU) 701, implements the above mentioned functionalities as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for executing operations in the disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present disclosure may be implemented by means of software or hardware. The described units or modules may also be provided in a processor, for example, described as: a processor, comprising a first sending unit, an analysis unit, a generation unit and a second sending unit, where the names of these units or modules do not in some cases constitute a limitation to such units or modules themselves. For example, the first sending unit may also be described as "a unit for sending a current multimedia content playlist to a playing terminal."

In another aspect, the present disclosure further provides a computer-readable storage medium. The computer-readable storage medium may be the computer storage medium included in the apparatus in the above described embodiments, or a stand-alone computer-readable storage medium not assembled into the apparatus. The computer-readable storage medium stores one or more programs. The one or more programs, when executed by a device, cause the device to: send a current multimedia content playlist to a playing terminal; analyze, in response to receiving a voice updating request from a user to update currently played multimedia content in the current multimedia content playlist, the voice updating request to obtain an updating instruction corresponding to the currently played multimedia content; search in a preset multimedia content database based on the updating instruction to generate an optimized multimedia playlist; and send the optimized multimedia playlist to the playing terminal The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for updating a multimedia playlist, the method comprising:
    sending a current multimedia content playlist to a playing terminal;
    analyzing, in response to receiving a voice updating request from a user to update currently played multimedia content in the current multimedia content playlist, the voice updating request to obtain an updating instruction corresponding to the currently played multimedia content;
    searching in a preset multimedia content database based on the updating instruction to generate an optimized multimedia playlist; and
    sending the optimized multimedia playlist to the playing terminal,
    wherein the searching in a preset multimedia content database based on the updating instruction to generate an optimized multimedia playlist comprises:
        determining that the updating instruction comprises a media name of the currently played multimedia content, an identifier for a leading author, and an instruction for switching a performer, wherein the leading author comprises the performer; and
        in response to determining that the updating instruction comprises the media name of the currently played multimedia content and the instruction for switching the performer, generating the optimized multimedia playlist by searching the preset multimedia content database for multimedia content with the media name and without a name of the performer, the optimized multimedia playlist including the multimedia content with the media name found from the preset multimedia content database and excluding the multimedia content with the name of the performer, and
    wherein the method is performed by at least one processor.

2. The method according to claim 1, wherein the searching in a preset multimedia content database based on the updating instruction to generate an optimized multimedia playlist comprises:
    determining that the updating instruction comprises an instruction for switching the currently played multimedia content; and
    in response to determining that the updating instruction comprises the media name of the currently played multimedia content and the instruction for switching the currently played multimedia content, generating the optimized multimedia playlist by searching the preset multimedia content database for multimedia content with the media name and other than the currently played multimedia content, the optimized multimedia playlist including the multimedia content with the media name found from the preset multimedia content database and excluding the currently played multimedia content.

3. The method according to claim 2, wherein the searching in a preset multimedia content database based on the updating instruction to generate an optimized multimedia playlist comprises:
    determining that the updating instruction comprises a keyword belonging to a preset category; and
    in response to determining that the updating instruction comprises the identifier for the leading author and the keyword belonging to the preset category, searching the preset multimedia content database with the identifier for the leading author and the keyword indicated by the updating instruction as a search condition to generate the optimized multimedia playlist;
    wherein the preset multimedia content database has a search index pre-established on a basis of the keyword.

4. The method according to claim 3, wherein the updating instruction comprises a plurality of keywords belonging to the preset category; and
    the searching in the preset multimedia content database with the identifier for the leading author and the keyword indicated by the updating instruction as a search condition to generate the optimized multimedia playlist comprises:
    in response to determining that multimedia content satisfying both the identifier for the leading author and all keywords contained in the updating instruction is not found from the preset multimedia content database, selecting a portion of keywords from the all keywords contained in the updating instruction, and searching the preset multimedia content database with the identifier for the leading author and the selected keywords indicated by the updating instruction as the search condition to generate the optimized multimedia playlist.

5. The method according to claim 1, wherein the searching in a preset multimedia content database based on the updating instruction to generate an optimized multimedia playlist comprises:
    determining whether the updating instruction comprises similar search intention; and
    in response to determining that the updating instruction comprises similar search intention, searching the preset multimedia content database for multimedia content having a similarity to the currently played multimedia content greater than a preset similarity threshold to generate the optimized multimedia playlist.

6. The method according to claim 5, further comprising:
    in response to determining that the updating instruction comprises the similar search intention, determining whether the updating instruction comprises a keyword having a preset category; and
    in response to determining that the updating instruction comprises the keyword including having the preset category, searching the preset multimedia content database for multimedia content having a similarity to the currently played multimedia greater than the preset similarity threshold and satisfying a search condition indicated by the keyword comprised in the updating instruction to generate the optimized multimedia playlist;

wherein the preset multimedia content database has a search index pre-established on a basis of the keyword.

7. An apparatus for updating a multimedia playlist, the apparatus comprising:
at least one processor; and
a memory storing instructions, which when executed by the at least one processor, cause the at least one processor to perform operations, the operations comprising:
sending a current multimedia content playlist to a playing terminal;
analyzing, in response to receiving a voice updating request from a user to update currently played multimedia content in the current multimedia content playlist, the voice updating request to obtain an updating instruction corresponding to the currently played multimedia content;
searching in a preset multimedia content database based on the updating instruction to generate an optimized multimedia playlist; and
sending the optimized multimedia playlist to the playing terminal,
wherein the searching in a preset multimedia content database based on the updating instruction to generate an optimized multimedia playlist comprises:
determining that the updating instruction comprises a media name of the currently played multimedia content, an identifier for a leading author, and an instruction for switching a performer, wherein the leading author comprises the performer; and
in response to determining that the updating instruction comprises the media name of the currently played multimedia content and the instruction for switching the performer, generating the optimized multimedia playlist by searching the preset multimedia content database for multimedia content with the media name and without a name of the performer, the optimized multimedia playlist including the multimedia content with the media name found from the preset multimedia content database and excluding the multimedia content with the name of the performer.

8. The apparatus according to claim 7, wherein the searching in a preset multimedia content database based on the updating instruction to generate an optimized multimedia playlist comprises:
determining that the updating instruction comprises an instruction for switching the currently played multimedia content; and
in response to determining that the updating instruction comprises the media name of the currently played multimedia content and the instruction for switching the currently played multimedia content, generating the optimized multimedia playlist by searching the preset multimedia content database for multimedia content with the media name and other than the currently played multimedia content, the optimized multimedia playlist including the multimedia content with the media name found from the preset multimedia content database and excluding the currently played multimedia content.

9. The apparatus according to claim 8, wherein the searching in a preset multimedia content database based on the updating instruction to generate an optimized multimedia playlist comprises:
determining that the updating instruction comprises a keyword belonging to a preset category; and
in response to determining that the updating instruction comprises the identifier for the leading author and the keyword belonging to the preset category, searching the preset multimedia content database with the identifier for the leading author and the keyword indicated by the updating instruction as a search condition to generate the optimized multimedia playlist;
wherein the preset multimedia content database has a search index pre-established on a basis of the keyword.

10. The apparatus according to claim 9, wherein the updating instruction comprises a plurality of keywords belonging to the preset category; and
the searching in the preset multimedia content database with the identifier for the leading author and the keyword indicated by the updating instruction as a search condition to generate the optimized multimedia playlist comprises:
in response to determining that multimedia content satisfying both the identifier for the leading author and all keywords contained in the updating instruction is not found from the preset multimedia content database, selecting a portion of keywords from the all keywords contained in the updating instruction, and searching the preset multimedia content database with the identifier for the leading author and the selected keywords indicated by the updating instruction as the search condition to generate the optimized multimedia playlist.

11. The apparatus according to claim 7, wherein the searching in a preset multimedia content database based on the updating instruction to generate an optimized multimedia playlist comprises:
determining whether the updating instruction comprises similar search intention; and
in response to determining that the updating instruction comprises similar search intention, searching the preset multimedia content database for multimedia content having a similarity to the currently played multimedia content greater than a preset similarity threshold to generate the optimized multimedia playlist.

12. The apparatus according to claim 11, wherein the operations further comprises:
in response to determining that the updating instruction comprises the similar search intention, determining whether the updating instruction comprises a keyword having a preset category; and
in response to determining that the updating instruction comprises the keyword having the preset category, searching the preset multimedia content database for multimedia content having a similarity to the currently played multimedia greater than the preset similarity threshold and satisfying a search condition indicated by the keyword comprised in the updating instruction to generate the optimized multimedia playlist;
wherein the preset multimedia content database has a search index pre-established on a basis of the keyword.

13. A non-transitory computer readable storage medium storing computer programs, wherein the programs, when executed by a processor, enable the processor to perform operations, the operations comprising:
sending a current multimedia content playlist to a playing terminal;
analyzing, in response to receiving a voice updating request from a user to update currently played multimedia content in the current multimedia content playlist, the voice updating request to obtain an updating instruction corresponding to the currently played multimedia content;

searching in a preset multimedia content database based on the updating instruction to generate an optimized multimedia playlist; and sending the optimized multimedia playlist to the playing terminal wherein the searching in a preset multimedia content database based on the updating instruction to generate an optimized multimedia playlist comprises:

determining that the updating instruction comprises a media name of the currently played multimedia content, an identifier for a leading author, and an instruction for switching a performer, wherein the leading author comprises the performer; and in response to determining that the updating instruction comprises the media name of the currently played multimedia content and the instruction for switching the performer, generating the optimized multimedia playlist by searching the preset multimedia content database for multimedia content with the media name and without a name of the performer, the optimized multimedia playlist including the multimedia content with the media name found from the preset multimedia content database and excluding the multimedia content with the name of the performer.

\* \* \* \* \*